Figure 1:
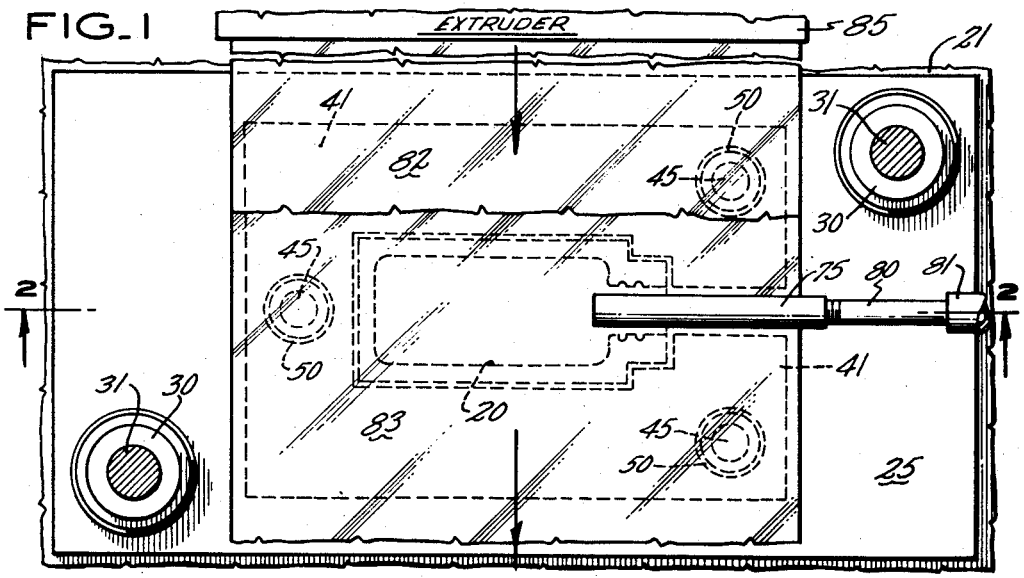

July 28, 1964 J. M. WILKALIS ETAL 3,142,089
METHOD AND APPARATUS FOR FINISHING BLOW MOLDED ARTICLES
Filed April 12, 1961 2 Sheets-Sheet 1

INVENTORS
JOSEPH M. WILKALIS
DONALD R. SEIFEL

BY Burns, Doane, Benedict, Swecker & Mathis
ATTORNEYS

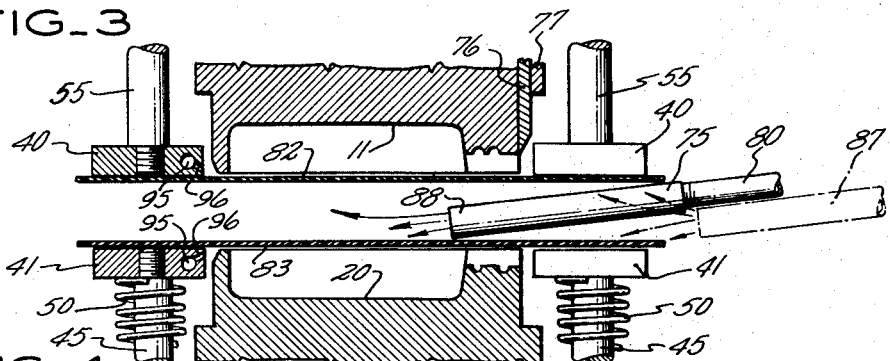

United States Patent Office 3,142,089
Patented July 28, 1964

3,142,089
METHOD AND APPARATUS FOR FINISHING
BLOW MOLDED ARTICLES
Joseph M. Wilkalis, West Hartford, and Donald R. Seifel, Wethersfield, Conn., assignors, by mesne assignments, to Monsanto Chemical Company, a corporation of Delaware
Filed Apr. 12, 1961, Ser. No. 102,585
11 Claims. (Cl. 18—5)

The present invention is directed to the problem of stripping the flash from an article molded from organic plastic sheet.

It is a primary object of the present invention to strip from a mold element externally surrounding sheet material to be detached from a molded article enclosed within the mold section in a manner to simplify the further processing of the molded article and avoid hand operations in locating and trimming therefrom flash resulting from the molding operation. It is a further object of the present invention to provide means for removing surrounding film material from an article molded from an organic plastic sheet.

The present invention further comprehends stripping surplus sheet material from a container blow molded from a pair of organic plastic sheets wherein the opposed mold elements are provided with relatively narrow peripheral land surfaces which engage the sheets therebetween during the molding operation to form a peripheral container seal. While the lands are in engagement with the plastic sheets, the surplus sheet material external of the mold elements is stripped from the mold with a tearing action to leave parting flash on the article that can be finished for commercial utilization by a heat treatment process.

In carrying out the present invention, a pair of opposed mold elements defining a container cavity are employed in a reciprocable arrangement in a molding press. The molds are formed with opposed peripheral land surfaces juxtaposable to engage a deformable plastic sheet positioned between the mold elements. The land surfaces provided in the present invention are of relatively narrow width, sufficient to form an effective seal between a pair of sheets where a container such as a bottle is to be manufactured.

While the mold elements are in closed relationship, engaging the deformable plastic sheet, portions of the sheet external of the mold structure are gripped between a pair of stripping members which abut into gripping engagement with the portions of the sheet material external of the mold adjacent the land surfaces of the mold elements. While the plastic sheet is engaged by both the land surfaces of both mold elements and both stripper members, a relative movement is imparted between the mold elements and the stripper members to detach the flash material from the plastic engaged between the mold elements. This movement effects partition of the plastic material at the peripheral zone of its engagement between the land surfaces of the mold elements, due to its compression therebetween. The resulting article may be stripped from the mold assembly in a conventional manner. The article thus manufactured will carry only a thin, feather-like, peripheral flash. When thermoplastic sheet material is employed, this flash may be condensed against the article by heating the flash momentarily with high temperature gas or a flame.

The present invention thus avoids hand finishing operations, wherein it is necessary to locate and mechanically trim off flash from plastic molded containers. Further, the method of the present invention permits large tolerances in the spacing of the stripper members from the engaging land areas of the mold elements. In particular, it avoids the necessity for surrounding the mold elements with severing means such as knives for shearing the external film material from the molded article, which structure demands very close tolerances in the external mold formation and in the co-acting shearing knife structure.

The method and apparatus of the present invention are directly applicable both to articles formed from two sheets of plastic material into a closed container such as a bottle, and to articles produced by the deformation of a single sheet such as a plate or a cake cover.

Figure 2:
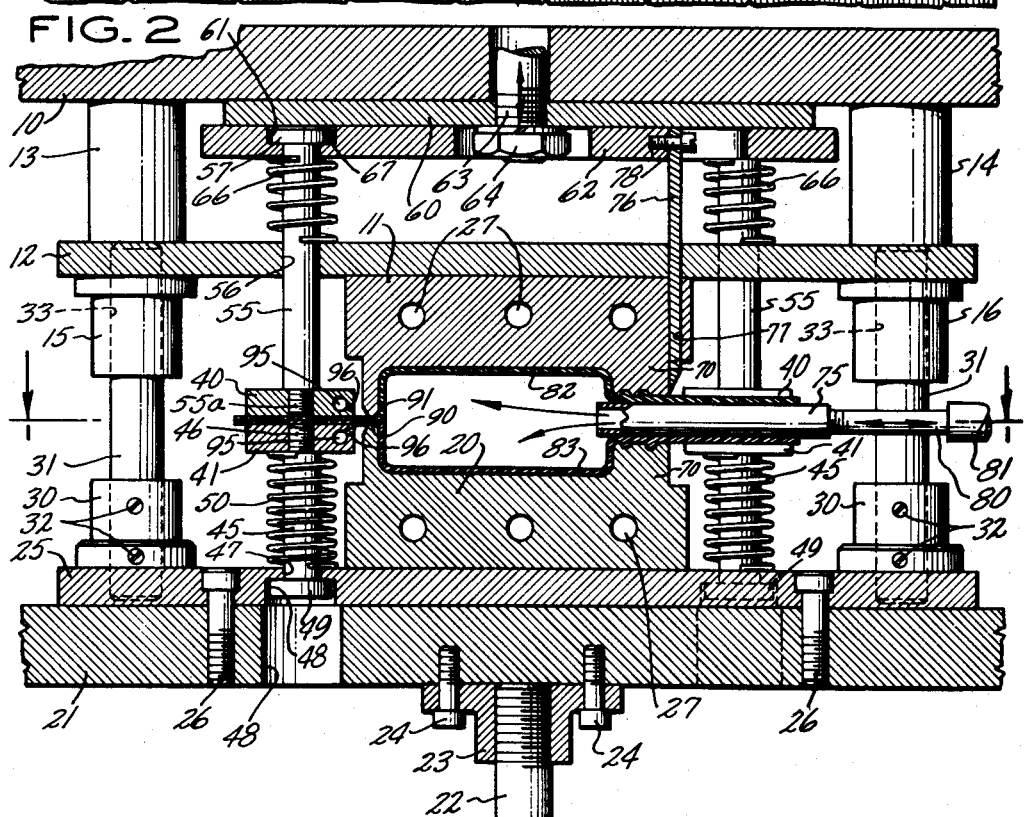

The invention will further be understood in connection with the drawings attached hereto, in which:

FIGURE 1 shows in horizontal section a press for carrying out the present invention with extruded plastic sheets positioned between the mold elements, FIGURE 2 is a vertical cross section taken on the line 2—2 of FIGURE 1 showing the formation of a bottle from two plastic sheets, FIGURES 3 and 4 show steps in the operation of forming the article and stripping the surplus sheet material therefrom, and FIGURE 5 shows a step in the formation of an article from a single plastic sheet.

In the press assembly for carrying out the present invention as shown in FIGURES 1 and 2, mounting element 10 is provided for supporting mold element 11. The latter mold element is directly mounted on a bolster plate 12 rigidly mounted on element 10 by spacers 13 and 14. The latter elements are provided with internally bored guide extensions 15 and 16.

The opposing mold element 20 is mounted on a reciprocable press member 21. The latter is longitudinally reciprocable by conventional pressure motor means (not shown) operating drive rod 22, threaded in the collar 23 which is attached to the press element by bolts 24. Secured between mold element 20 and the press element 21 is plate 25 attached thereto by bolts 26.

The reciprocable press member 21 carries collars 30 annularly surrounding guide members 31 retained therein by said screws 32.

Guide members 31 are cylindrical and are reciprocably received in bores 33 of the spacer extensions 15 and 16. Thus, the guide members 31 and the co-acting elements 15 operate to maintain the opposed mold elements, under reciprocation, in the predetermined desired relationship.

Both mold elements, 11 and 21, may be provided with conduits such as 27 for receiving a temperature controlled fluid.

The flash removing mechanism, as shown in FIGURE 2, comprises a pair of stripping members 40 and 41 positioned on opposite sides of the parting plane of mold elements 11 and 20. In the structure shown in FIGURE 2 the lower stripping member 41 is carried by mounting rods 45 of cylindrical cross section and tapped into the stripping member at 46. The lower end of each rod passes through bore 47 of plate 25 which is provided with recess 48 extending through element 21 to permit head 49 of the guide rod to be displaced downwardly.

Springs 50 are provided surrounding each mounting rod 45 to bias the lower stripping member 41 to the position shown in FIGURE 2, but permitting its displacement to the position shown in FIGURE 4.

In the illustrated construction, the stripper members are interrupted opposite the neck portion of the mold, and thus surround the mold in a C-shaped configuration.

The upper stripper member 40 is carried by guide rods 55 secured at their lower ends thereto at 55a. The guide rods pass freely through bolster plate 12 at bores 56 and terminate in an upper terminal head 57. The latter is received between plate 60 and bore enlargements 61 in plate 62 attached thereto. Plate 60 is operated by drive rod 63 centrally threaded thereinto and provided with lock nut 64. When plate 60 is lowered, it drives mounting rods 55 by engagement with head portions 57 of the mounting rods 55.

The exemplary mold shown in FIGURE 2 comprises a screw-top bottle mold in which the neck portion of the bottle is formed at mold portions 70. In this section of the article formed, pinching lands are not used and the mold elements co-act to form the neck of the bottle with a blow head 75. In order to sever the flash from the neck portion of the bottle a knife 76 is used which passes down the common plane of the outer faces of the two mold elements in this area through guide 77. At its upper end knife 76 is carried by plate 62 to which it is attached by screws 78. The blow head is moved into and out of operative position in a manner later to be described by suitable motor means not shown in the drawing, or by hand.

The blow head is fed air under suitable valve programming at the various pressures required in the operation, through nipple 80 and a flexible air hose 81.

As best shown in FIGURE 1, the plastic sheet material 82 and 83 is extruded from extruder 85 between the open mold elements for the formation of the desired product. Conventional tensioning mechanism may be provided to draw the sheets between the molds for forming each article. Alternatively, the press may be oriented so that the parting face of the mold arrangement is in a vertical plane, and the sheets fed by gravity. The thickness of the sheet is exaggerated in the drawings.

The operation of the press is further illustrated in FIGURES 3 and 4.

In the initial stage shown in FIGURE 3 the mold halves have been separated by lowering mold element 20 by motor operation of drive rod 22. This effects positioning of the mold elements and stripper members in the relationship shown in FIGURE 3. Extruder 85, in this embodiment, simultaneously produces a pair of plastic sheets 82 and 83 under temperature conditions which render the same deformable during the molding operation. As the sheets are fed between the molds, blow head 75 is introduced between the sheet elements and receives low pressure air, for instance, at two pounds per square inch, for maintaining the sheets in separated positions lightly abutting the upper and lower mold elements as shown in FIGURE 3. The position programming means provided for the blow head effects a progressive insertion from the position 87 shown in FIGURE 3 to the full line position 88 as shown in the same figure, as the new sheet portions reach their final position between the mold elements. The blow head 75 is shown in operating position in FIGURE 2 after the mold sections are closed by elevation of drive rod 22 under operation of its fluid motor. In this position the mold elements are pressed together on either side of the plastic material which is peripherally sealed around the mold cavity by opposing land elements 90 and 91. In the neck portion of the article, the molds seal the plastic sheets around blow head 75. At the time the molds are brought into operating position surrounding the two plastic sheets, stripper members 40 and 41 abut into gripping engagement with the flash material, as shown in FIGURE 2. Each stripper member is provided with a temperature controlled fluid supply conduit 95, having spaced feed apertures 96 to direct a cooling blast at the plastic exteriorly of the mold structure itself. This cools the plastic from the extrusion temperature and sets up an increasingly strengthened condition thereof between the pinching lands of the mold structure and the stripping members. Additionally, the stripping members themselves are maintained in a cooled condition relative to that of the mold structure by the temperature control fluid in conduit 95.

Upon mold closure and sealing of the plastic sheets together between the pinching lands and also between the molds neck portions and the blow head, high pressure molding air is introduced through the blow head to expand the plastic sheets into the form determined by the mold cavity configuration, as shown in FIGURE 2. A typical molding pressure supplied by the blow head would be relatively high compared to the initial pressure applied to maintain the sheets in the position shown in FIGURE 3, and could extend to 90 pounds per square inch or materially higher if necessary.

Upon completion of the blowing operation the positioning program device for the blow head retracts the same from the mold area to a position such as shown in FIGURE 4 of the drawings. Then drive rod 63 is operated to lower plate 60. This causes knife 76 to sever the neck of the article and separate the flash in that area. As knife 76 passes downwardly over the neck portion of the article, drive rods 55 connected to the upper stripping member 40 are forced downwardly, compressing springs 50 surrounding the guide rods for the lower stripper member 41. This operation elongates the plastic sheet portions connecting the stripper members to the pinching lands and causes the plastic material to part along a line in the outer zone of the pinching lands. This parting takes place in a relatively thin portion of the material which is in a softened condition between the lands of the relatively warmer mold elements.

After stripping the film from the article, drive rod 63 is raised to release the severed flash material from between the stripping members as the lower mold element 20 is lowered by retraction of guide rod 22, carrying therewith the lower stripping member 41. At the conclusion of the molding and stripping operation, the mold elements and stripping members assume the relative positions shown in FIGURE 3, at which stage the molded object may be removed from the mold. The stripped material is drawn from between the molds to position simultaneously extruded new sheet portions for a subsequent molding operation.

In actual operating conditions, the flash adhering to the article around the parting plane may be five to fifteen thousandths of an inch thick, and extends out about fifteen to thirty-two thousandths of an inch.

The molded element shown in FIGURE 2, upon removal from the press, may be gas heated around the parting zone for improving its finished appearance, if required for its ultimate utilization. With polyethylene, a combustible gas flame may be directly applied to the flash. Under plasticizing temperature conditions, the thermoplastic flash material retracts toward the article surface and leaves a slight bead around the sealed area in which the sheets were originally joined.

In the system shown in FIGURE 5, the upper mold member 110 constitutes a flat surface co-acting a suitably shaped lower mold member 111 to form a plate or cake cover from a single sheet of plastic 112 delivered by a single sheet extruder similar to extruder 85 of FIGURE 1. In the form shown in FIGURE 5 the movable programmed blow head is not employed, and fluid pressure is applied to the softened plastic sheet by air or other gas pressure introduced through connection 113 in plate 114 connecting with fluid distribution conduits 115 in upper mold section 110. This fluid pressure is applied after the mold sections 110 and 111 abut into sealing juxtaposition against plastic sheet 112, and forces the same downward into the configuration of the lower mold cavity.

The lower mold section is provided with means for bleeding the air below the plastic sheet and for this purpose carries bottom plate 116 spaced above lower mold face 117 by spacing elements 118 to form a peripheral exhaust conduit around the lower edge of the formed article which is vented to atmospheric pressure or a vacuum source through connection 119.

Where a vacuum source of sub-atmospheric pressure is employed, the same may be programmed to operate to abstract the air from the lower mold section after the molds are brought into juxtaposition either before or simultaneously with the introduction of molding pressure at connection 113.

Operation of the press to sever the surplus sheet material outside the mold operates in connection with the gripping members 40 and 41 to effect a flash removal exactly as shown in connection with FIGURE 4 of the drawings.

The parting edge obtained on the container manufactured in accordance with FIGURE 5 of the drawings will be entirely satisfactory for many commercial uses. In some applications, however, the peripheral edge of the article may be heat treated for smoothing it in accordance with the above discussed procedure.

In the construction and operation of the invention, it has been ascertained that with usual film thicknesses the pinching lands will give entirely satisfactory operation under suitable temperature control where the width is of the order of one-eighth to three-eights of an inch, more or less. It is particularly noteworthy that the distance between the engagement of the film by the stripping members and the peripheral mold elements is not critical, and the invention permits extensive design freedom in regard to this parameter. Furthermore, the width of the stripping members need be only sufficient to effect a solid engagement with the flash film area and need not be as great as shown in the embodiments of the drawings.

We claim:

1. In a molding press, a plurality of film mold elements forming in juxtaposition a mold cavity, at least two of said elements being juxtaposable adjacent a parting plane of said cavity and having pinching lands of limited width in said plane outside the cavity, a pair of stripping members positionable on either side of said plane proximate to but spaced from the mold lands, means for forcing at least one of the stripping members toward the other, and drive means operable during operation of the first recited means to cause parallel relative displacement of the stripping members and the pinching lands by movement transverse to said plane to part external film portions from film portions engaged between the pinching lands.

2. The press of claim 1 in which the stripping members comprise fluid outlet means operative to direct temperature controlled fluid toward said lands to contact a film engaged therebetween.

3. The press of claim 1 in which the mold elements define a bottle cavity including an externally communicating extension to form a neck portion, and further including knife means operative to transit the cavity extension transversely across the parting plane under operation of the drive means.

4. The press of claim 1 in which one of said two mold elements is flat and further comprises fluid pressure supply means for admitting fluid pressure to the cavity.

5. The method of removing flash from an article blow molded from an organic thermoplastic sheet engaged in a mold between narrow peripheral pinching lands comprising gripping the sheet at areas adjacent to but spaced from the molds and lands, and uniformly displacing the gripped portion to severe it from the article.

6. The method of claim 5 further including the steps of removing the article from the mold and heat treating flash material adhered thereto to retract the same to the body of the article.

7. In a molding press, mold elements at least two of which have relatively narrow coacting pinching land surfaces, film supply means operative to supply film between said mold elements extending substantially beyond said land surfaces, means independent of the mold elements operative to grip the extending film at points adjacent to but spaced from the engaging land surfaces whereby the film extends free between the gripping means and the mold elements, and drive means operable to cause parallel relative displacement between the land surfaces and the second recited means to part the extending film from film portions engaged between the land surface.

8. In a molding press, a plurality of mold elements forming in juxtaposition a mold cavity, at least two of said elements being juxtaposable and having facing pinching land surfaces of limited width adjacent said cavity, film supply means operative to supply film from a predetermined direction between said juxtaposable elements of a width substantially greater than the dimension of said mold elements transverse to said film supply direction and extending substantially beyond said land surfaces, means independent of the mold elements operative to grip the extending film when the film is engaged between said land surfaces at points adjacent to but spaced from said elements whereby the film extends free between the gripping means and the mold elements, and drive means operable to cause parallel relative displacement between the land surfaces and the gripping means to part the extending film from film portions engaged between the lands.

9. The press of claim 1 in which the stripping members extend around the mold cavity and along two opposite sides of said two mold elements.

10. A molding press comprising a plurality of mold elements forming in juxtaposition a mold cavity, said elements being juxtaposable adjacent a parting plane of said cavity and having pinching lands of limited width in said plane outside said cavity, film supply means operative to supply a film along said plane extending substantially beyond said pinching lands on opposite sides of said mold elements, means independent of the mold elements operative to grip extending portions of film engaged between said lands at points adjacent to but spaced from said elements whereby the film extends free between the gripping means and the mold elements, said gripping means extending along opposite sides of the mold elements, and motor means operative to move the gripping means transversely away from said plane to part said extending film portions from film portions engaged between said lands.

11. A molding press comprising a plurality of mold elements forming in juxtaposition a mold cavity, said elements being juxtaposable adjacent a parting plane of said cavity and having pinching lands of limited width in said plane outside said cavity, film supply means operative to supply a film along said plane extending substantially beyond said pinching lands on opposite sides of said mold elements, means independent of the mold elements operative to grip extending portions of film engaged between said lands at points adjacent to but spaced from said elements whereby the film extends free between the gripping means and the mold elements, said gripping means extending along opposite sides of the mold elements, and motor means operative to move the gripping means into engagement with said extending film portions and then operative by a continuation of said motion to move the gripping means transversely away from said plane to part said extending film portions from film portions engaged between said lands.

(References on following page)

References Cited in the file of this patent

UNITED STATES PATENTS

| | | | |
|---|---|---|---|
| 184,604 | Fessenden | Nov. 21, | 1876 |
| 1,339,789 | Cuttrell | May 11, | 1920 |
| 1,577,655 | Parker | Mar. 23, | 1926 |
| 2,587,792 | Von Sivers | Mar. 4, | 1952 |
| 2,849,347 | Uziel | Aug. 26, | 1958 |
| 2,890,483 | Soubier | June 16, | 1959 |
| 2,918,698 | Hagen et al. | Dec. 29, | 1959 |
| 2,943,349 | Adams et al. | July 5, | 1960 |
| 2,953,814 | Mumford | Sept. 27, | 1960 |
| 2,975,471 | Sherman | Mar. 21, | 1961 |
| 2,984,865 | Mumford | May 23, | 1961 |
| 2,988,776 | Schaich | June 20, | 1961 |
| 2,994,103 | Schaich | Aug. 1, | 1961 |
| 3,040,380 | Alosky | June 26, | 1962 |

UNITED STATES PATENT OFFICE
CERTIFICATE OF CORRECTION

Patent No. 3,142,089                                July 28, 1964

Joseph M. Wilkalis et al.

It is hereby certified that error appears in the above numbered patent requiring correction and that the said Letters Patent should read as corrected below.

In the grant, lines 3 and 13, and in the heading to the printed specification, line 6, for "Monsanto Chemical Company", each occurrence, read -- Monsanto Company --.

Signed and sealed this 20th day of April 1965.

(SEAL)
Attest:

ERNEST W. SWIDER
Attesting Officer

EDWARD J. BRENNER
Commissioner of Patents